H. B. PALMER.
TOY GUN.
APPLICATION FILED FEB. 29, 1916.
Reissued Apr. 11, 1916. 14,106.
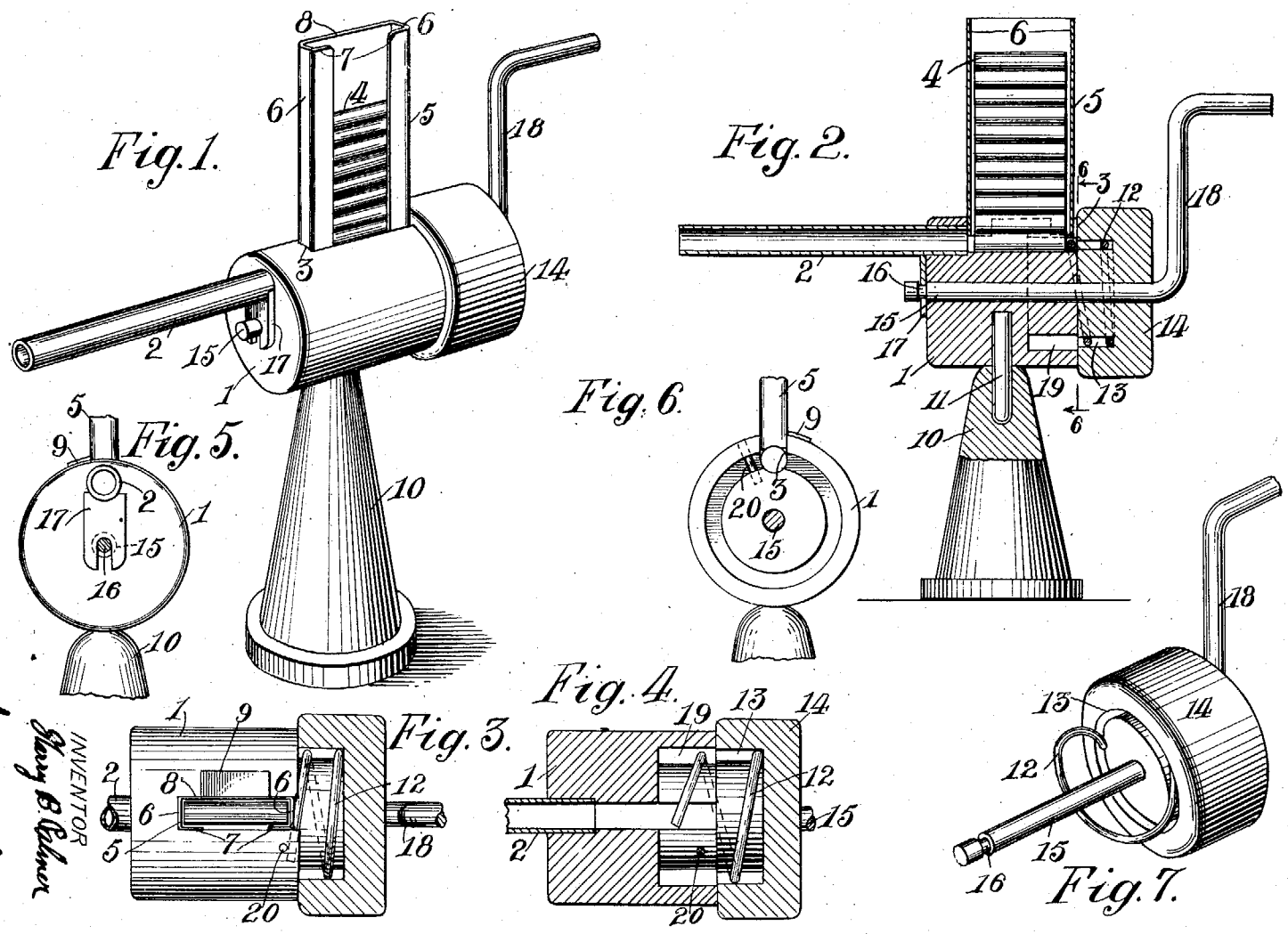
INVENTOR
Harry B. Palmer
BY Chapin & Neal
ATTORNEYS

UNITED STATES PATENT OFFICE.

HARRY B. PALMER, OF MORRISTOWN, NEW JERSEY.

TOY GUN.

14,106. Specification of Reissued Letters Patent. Reissued Apr. 11, 1916.

Original No. 1,086,727, dated February 10, 1914, Serial No. 788,048. Application for reissue filed February 29, 1916. Serial No. 81,277.

*To all whom it may concern:*

Be it known that I, HARRY B. PALMER, a citizen of the United States, and a resident of Morristown, in the county of Morris and State of New Jersey, have invented certain new and useful Improvements in Toy Guns, of which the following is a specification.

My invention relates to guns and more particularly to guns suitable as toys.

The invention preferably takes the form of a magazine gun in which the continuous rotation of a crank or other suitable operating member serves to automatically drive or propel a series of projectiles in succession from the gun body.

The gun contemplated by this invention is preferably of such a construction as to eliminate the necessity for the use of explosives or other dangerous elements in connection with the operation thereof, the value of the same as a toy being thereby greatly enhanced.

The principal object of my invention is to provide a device of the character above referred to which is efficient in action and which can be manufactured at a low cost.

A further object of my invention is to provide in a toy gun an improved propelling means for the projectile, comprising a rotatable spring curved about an axis and means to engage said spring to put it under stress as the latter is rotated, all arranged so that the spring gradually cams by said means due to the curve in the spring and is put under stress thereby and then is suddenly released to expend its accumulated energy upon the projectile by reason of which arrangement the operation of the gun is made smoother and more efficient than toy guns of the prior art, such, for example, as is shown in British Patent to Meier No. 13,492, granted June 12, 1906.

A particular object of my invention is to provide an improved propelling means for the projectile. I accomplish this object by providing a spring device suitably mounted to coöperate with a device to gradually and repeatedly compress and suddenly release the spring as one of said devices is continuously rotated and in combination with said devices means to hold a projectile independently of the spring and in position to receive the accumulated energy and full force of the impact when the spring device is released.

Another object of my invention is to provide a rotatable spring having a free end curved about an axis and an abutment arranged in the path of the curved spring to engage the latter during a material part of its rotation to gradually put the latter under stress and then suddenly release it to propel the projectile.

Further objects of my invention will appear more fully in the following specification and appended claims.

In order that my invention may be more clearly understood, attention is hereby directed to the accompanying drawing, forming a part of this specification, and in which:

Figure 1 is a perspective view of a gun embodying my invention. Fig. 2 is a central vertical sectional view thereof. Fig. 3 is a fragmentary plan view, partly in section, showing the mechanism for driving or propelling the projectile from the gun body in position occupied immediately prior to the actuation or discharge of the projectile. Fig. 4 is a sectional view showing the projectile propelling mechanism in position occupied immediately after the discharge of the projectile. Fig. 5 is a fragmentary front elevation of the gun. Fig. 6 is a view taken on the line 6—6 of Fig. 2 and looking in the direction of the arrows: and Fig. 7 is a detail perspective view of the mechanism for discharging the projectile.

In all the views like parts are designated by the same reference numerals.

Referring to the drawing, a horizontal body member 1, preferably cylindrical in shape, has secured to one end thereof a tube 2 extending longitudinally of the body member and constituting the gun barrel. An opening 3 formed in the top of the body member 1 communicates with the interior of the tube 2 and is adapted to receive in succession the projectiles 4 fed into the same from the magazine 5. The lower portion of the opening 3 is preferably flush with the inside of the tube, as shown in Figs. 2 and 4, so as to facilitate the passage of the projectiles from said opening into said tube. The magazine 5 is preferably formed by turning over opposite edges of a rectangular sheet of sheet metal so as to form parallel walls 6, 6 from which inwardly directed flanges 7, 7 extend in alinement with each other and parallel with the base portion 8 of the magazine. The cross section of the magazine is preferably such that the magazine fits comparatively closely within the opening or recess 3, a rearwardly directed flange 9 being formed on the portion 8 of the magazine to limit the downward movement of the latter and thereby prevent the same from obstructing the passage of the projectiles into the tube 2. The magazine may be held in the gun body simply by friction or it may be secured thereto in any other suitable manner. The body 1 and the parts carried thereby are mounted upon a base 10, as by means of a vertical pivot 11 secured on the gun body, it being thus possible, without disturbing the position of the base 10, to turn the gun to different angular positions.

The projectile discharging or propelling mechanism preferably comprises a helical spring 12 secured at one end within an annular groove 13 formed in one end of a cylindrical member 14. The said member is immovably secured upon a stem 15 which passes axially through the same and the spring 12 and also axially through the member 1, being rotatable within the latter. The stem 15 projects at one end a slight distance beyond the body 1, and the projecting portion thereof is formed with a peripheral groove 16 which receives a locking member 17, the latter bearing against the end of the body portion 1 and thus serving to keep the stem 15 from being displaced from the body member 1. The member 17 is maintained in operative engagement with the rod or spindle 15 by the tube 2, which engages the upper surface of the said member, as clearly shown in Figs. 1, 2, and 5.

The end of the rod or stem 15 opposite to that containing the groove 16 is bent to the form of a crank 18 so as to facilitate the rotation thereof, together with the member 14 and the spring secured thereto. The said spring may be secured to the member 14 in any suitable manner, but I prefer to make the same of slightly larger external diameter than the groove 13, and to force the same into said groove, the resiliency of the spring thus holding the same firmly in position. The friction of the spring on the side of groove 13 need not be very large to cause the spring to be carried along with the member 14 during the rotation of the latter. An annular groove or recess 19 is formed in the body member 1 opposite and in alinement with the groove 13, the groove 19 being of slightly greater outer diameter than the spring 12 and arranged to receive the free end of the spring. A pin or abutment 20 extends across the groove 19 at a point slightly to one side of the opening 3 and near the outer end of said groove, this pin or abutment serving to compress the spring 12 axially, as shown in Fig. 3, prior to the discharge of the projectile.

In operation, one or more projectiles 4 are placed within the magazine 5, the lowermost projectile assuming a position in alinement with the tube 2 suitable to be acted upon by the spring 12. The crank 18 is then rotated, whereupon the spring 12 is compressed by reason of its action upon the pin or abutment 20, as shown in Fig. 3, further rotation of the crank 18 serving to move the free end of the spring 12 past the pin or abutment 20 to permit said free end to spring outwardly toward the barrel 2 and to drive the lowermost projectile supported by the body member 1 in line with barrel 2 through said barrel and through the atmosphere a distance depending upon the stress of the spring prior to the release thereof. The released position of the spring is shown clearly in Fig. 4. As soon as one projectile has been discharged, the remaining projectiles fall downwardly by gravity until another projectile assumes a position in the gun body ready to be discharged therefrom. Further rotation of the crank again serves to put the spring under stress, and then to release the same and to cause the lowermost projectile to be driven from the gun body. It will thus be seen that continuous rotation of the crank 18 in a clockwise direction serves alternately to gradually place the spring 12 under compression and to suddenly release the same, and in this manner to intermittently discharge the projectiles from the gun.

Numerous modifications may be made in the specific features disclosed without departing from the spirit of my invention.

What I claim is—

1. In a device of the class described, the combination of a gun body arranged to hold a projectile in position for but independently of its driving spring, a spring device for driving a projectile from said body, a coöperating device to gradually and repeatedly compress and suddenly release the spring device as one of said devices is continuously rotated and means for continuously rotating one of said devices.

2. In a device of the class described, the combination of a gun body, rotary means comprising a continuously rotatable spring curved about its axis of rotation, means arranged to gradually put the spring under compression during its rotation and suddenly release it for driving a projectile from said body, and means for rotating said rotary means.

3. In a device of the class described, the combination of a gun body, a magazine adapted to feed projectiles successively in position to be driven from said body, and means for driving the projectiles successively from said body, said means comprising a curved spring mounted for continuous rotation and a coöperating device to gradually put the spring under stress and suddenly release it during its rotation.

4. In a device of the class described, the combination of a gun body, and mechanism for driving a projectile from said body, said mechanism comprising a continuously rotatable curved spring, and means for alternately placing said spring under stress gradually and suddenly releasing the same during the rotation of the spring in a given direction.

5. In a device of the class described, the combination of a gun barrel, and means for driving a projectile from said barrel, said means comprising a helical spring rotatable about its axis and means operating during the rotation of the spring for alternately placing said spring under stress substantially in the direction of its axis and releasing the same, substantially as described.

6. In a device of the class described, the combination of a gun body, means for driving a projectile from said body, said means comprising a rotary spring curved about its axis of rotation, and a stationary abutment engaging said spring to intermittently and gradually compress and suddenly release the same during the rotation of the spring.

7. In a device of the class described, the combination of a gun barrel, and means for driving a projectile from said barrel, said means comprising a spring rotatable about an axis extending longitudinally of the gun barrel, and means operating during the rotation of the spring for alternately placing said spring under stress and releasing the same, substantially as described.

8. In a device of the class described, the combination of a gun body, and mechanism for driving a projectile from said body, said mechanism comprising a continuously movable curved spring, and means for alternately placing said spring under stress gradually and suddenly releasing the same during the movement of the spring in a given direction.

9. In a device of the class described, the combination of a gun body, means for driving a projectile from said body, said means comprising a bodily movable curved spring, and a stationary abutment engaging said spring to intermittently and gradually compress and suddenly release the same during the movement of the spring.

HARRY B. PALMER.

Copies of this patent may be obtained for five cents each, by addressing the "Commissioner of Patents, Washington, D. C."